(12) United States Patent
Saghir

(10) Patent No.: US 6,574,616 B1
(45) Date of Patent: Jun. 3, 2003

(54) STOCHASTIC VISUALLY BASED IMAGE QUERY AND RETRIEVAL SYSTEM

(75) Inventor: Jamil Saghir, Stamford, CT (US)

(73) Assignee: Index Stock Imagery, Inc., New York, NY (US)

(*) Notice: Subject to any disclaimer, the term of this patent is extended or adjusted under 35 U.S.C. 154(b) by 0 days.

(21) Appl. No.: 09/545,314

(22) Filed: Apr. 7, 2000

Related U.S. Application Data

(60) Provisional application No. 60/182,974, filed on Feb. 16, 2000.

(51) Int. Cl.$^7$ ............................................. G06F 17/30
(52) U.S. Cl. .............................. 707/1; 707/6; 358/403; 882/305
(58) Field of Search .............................. 707/3–6, 9–10, 707/104.1, 1; 358/403; 382/305

(56) References Cited

U.S. PATENT DOCUMENTS

| | | | | |
|---|---|---|---|---|
| 5,913,205 A | * | 6/1999 | Jain et al. ..................... | 707/2 |
| 6,072,904 A | * | 6/2000 | Desai et al. .................. | 382/225 |
| 6,163,622 A | * | 12/2000 | Abdel-Mottaleb et al. .. | 382/170 |
| 6,181,818 B1 | * | 1/2001 | Sato et al. ................... | 382/170 |
| 6,182,069 B1 | * | 1/2001 | Niblack et al. ............... | 707/6 |
| 6,226,636 B1 | * | 5/2001 | Abdel-Mottaleb et al. .. | 707/104.1 |
| 6,246,804 B1 | * | 6/2001 | Sato et al. ................... | 382/284 |
| 6,253,201 B1 | * | 6/2001 | Abdel-Mottaleb et al. .. | 707/4 |
| 6,285,995 B1 | * | 9/2001 | Abdel-Mottaleb et al. .. | 707/2 |
| 6,345,275 B2 | * | 2/2002 | Lee ............................ | 707/6 |

\* cited by examiner

*Primary Examiner*—Jean M. Corrielus
*Assistant Examiner*—Jean Bolte Fleurantin
(74) *Attorney, Agent, or Firm*—St. Onge Steward Johnston & Reens LLC

(57) ABSTRACT

An image search and retrieval system for searching and retrieving a desired image from a collection of images is provided. The system includes a computer and a plurality of images accessible by the computer. Each of the images has associated therewith an image profile also accessible by the computer. A plurality of selection probability functions are provided, which are set to initial values at the beginning of the search. Software executing on the computer selects a plurality of images based upon the relationship between the profile for each image and the values of the selection probability functions, and displays the selected images. Software executing on the computer receives an indication of at least one chosen image and adjusts the value of each of the selection probability functions based upon the profiles of the chosen images. The software selects and displays images, receives an indication of at least one chosen image, and adjusts the value of each of the selection probability functions iteratively until the search is terminated. Preferably, each image profile comprises a plurality of rankings for a plurality of categories, and most preferably, the plurality of rankings comprise a plurality of characteristic functions, each of which represents a probability distribution function which describes the probability of an image being selected given user preferences within a category. The plurality of characteristic functions may take the form of a Gaussian function, or a bell curve, although such is not strictly required.

48 Claims, 11 Drawing Sheets

STOCHASTIC VISUALLY BASED IMAGE QUERY AND RETRIEVAL SYSTEM

This application claims priority from U.S. Provisional Patent Application No. 60/182,974, filed Feb. 16, 2000 expired.

FIELD OF THE INVENTION

The present invention relates to an image search system for searching for and retrieving a desired image from a memory device which has a number of images stored thereon.

BACKGROUND OF THE INVENTION

One of the most important technologies needed across many traditional and emerging applications is the management of visual information. Every day we are bombarded with information presented in the form of images. So important are images in our world of information technology, that we generate literally millions of images every day, and this number keeps escalating with advances in imaging, visualization, video, and computing technologies.

It would be impossible to cope with this explosion of image information unless the images were organized for rapid retrieval on demand. A similar situation occurred in the past for numeric and other structured data, and led to the creation of computerized database management systems. In these systems, large amounts of data are organized into fields, with important or key fields being used to index the databases making search very efficient. These systems, however, are limited by the fact that they work well only with numeric data and short alpha-numeric strings. In the same way, the creation of massive image repositories is of little value unless there are methods for fast and accurate retrieval of desired images from these image databases.

Traditional methods available for searching for and retrieving a desired image have included searching through still images one at a time, or by searching through a list of titles assigned to respective ones of the still images, which titles may or may not be grouped in trees corresponding to subject categories representative of the content of the images. With the method of searching for images one by one, however, problems are encountered in that this method leads to operator eye fatigue and has a low search speed. With the method of search and retrieval from a title list, the images cannot be searched while being observed. Consequently, the accuracy of the search is poor and the search is difficult to perform.

In more modern search and retrieval systems, searching and classifying images is typically based on storing images in a database with descriptive text annotations. The user then searches by inputting a text description of an image and attempting to locate images that have a matching text description. There are numerous disadvantages, however, with using this approach to search or classify images.

One such disadvantage is that a user must decide which visual elements of an image are significant and worth describing. This subjective judgment may overlook various image details that may later be part of image characteristics for which the user is searching. Thus the user may not note or describe specific objects in the background of an image and/or may overlook significant colors, shapes, the presence of persons, or other elements which the user desires in the image. These problems are compounded if the user does not have a clear idea of what is desired. Another disadvantage is that even if the user does have a clear idea of what is desired, the user may have trouble verbalizing this mental image. In order for these prior art searching systems to be effective, the user must describe the desired image in terms that match the stored text description of the image. If the user does not use the precise wording which corresponds to the text description, relevant images will not be retrieved.

Thus, these search and retrieval systems which are based upon image text descriptions may be adequate when the user has a clear idea of the desired image and can verbalize this mental image. However, these systems can be time consuming and frustrating if the user does not have a clear mental picture of the desired image or if the user cannot verbalize a query. In such instances, it should be the task of the search and retrieval system to determine what the user desires, not the responsibility of the user to form his or her thoughts into machine-readable queries. This is a fundamental limitation of textually based search and retrieval systems.

Attempts have been made to overcome the deficiencies of such textually based systems. One example of such an attempt can be found in U.S. Pat. No. 5,802,361 ("the '361 patent"), which discloses a method and system for searching graphic images and videos, and which is illustrated in FIGS. 9 and 10. The system includes a user interface which allows a user to graphically construct a search inquiry with icons representing image attributes corresponding to image data reflective of the images stored on the system. Referring to FIG. 9, a user inputs a graphical query at 902, specifying a parameter Z and a weight to be accorded to parameter Z. At 904, the system retrieves from an images database 906, and displays to the user, images having the specified parameter Z at or as close as is available to the specified parameter weight. The user, at 908, chooses one or more of the retrieved images as desirable. The system, at 910, recalculates the weight of parameter Z according to the weight of parameter Z of the retrieved images and retrieves from images database 906, and displays to the user, new images having parameter Z at or as close as is available to the recalculated parameter weight. The user may then, at 912, elect to repeat the choosing and recalculating process in another iteration, or to end the search at 914 if desired images have been located.

Although the system embodied in the '361 patent does obviate some of the disadvantages of textually based searching methods, the system suffers from a number of disadvantages of its own. One of these disadvantages is that although the system does not require a user to enter a textually based query, it does require the user to enter a graphically based query. Thus, this system does nothing to help the situation where a user is having trouble visualizing precisely what is desired in an image. If the user cannot visualize the image sufficiently to enter a text based inquiry, the user will not be able to enter a graphical inquiry. Another disadvantage of the system is that the system can only accord weights to specific parameters entered by the user. Thus, for example if the user specifies parameter Z, the system only iteratively adjusts the weight of parameter Z when a user chooses desirable images. Suppose, for example, a user chooses images heavily weighted toward a second parameter Y, the system cannot recognize this and return images weighted toward parameter Y. Thus, the user would have to recognize a desire for parameter Y without any help from the system (which is often difficult if not impossible), and would have to manually enter a new search query specifying both parameter Z and parameter Y.

It should be noted that the '361 patent, the disadvantages thereof, and FIGS. 9 and 10 are discussed in more detail below.

What is desired, therefore, is an image search system for searching for and retrieving a desired image from a collection of images which is efficient and allows users to quickly find desired images, which is accurate in returning images likely to be desirable to the user, which does not require the user to verbalize desirable image attributes, which does not require the user to preconceive a mental image of what is desired before the search, which does not require the user to enter a search query, and which is adaptable in that the system readily and automatically adjusts search criteria during the search to reflect a user's desires.

SUMMARY OF THE INVENTION

Accordingly, it is an object of the present invention to provide an image search and retrieval system for searching for and retrieving a desired image from a collection of images which is efficient and allows users to quickly find desired images.

Another object of the present invention is to provide an image search and retrieval system having the above characteristics and which is accurate in returning images likely to be desirable to the user.

A further object of the present invention is to provide an image search and retrieval system having the above characteristics and which does not require the user to verbalize desirable image attributes.

Still another object of the present invention is to provide an image search and retrieval system having the above characteristics and which does not require the user to preconceive a mental image of what is desired before the search.

Yet a further object of the present invention is to provide an image search and retrieval system having the above characteristics and which does not require the user to enter a search query.

Yet another object of the present invention is to provide an image search and retrieval system having the above characteristics and which is adaptable in that the system readily and automatically adjusts search criteria during the search to reflect a user's desires.

These and other objects of the present invention are achieved by provision of an image search and retrieval system including a computer and a plurality of images accessible by the computer. Each of the images has associated therewith an image profile also accessible by the computer. A plurality of selection probability functions are provided, which are set to initial values at the beginning of the search. Software executing on the computer selects a plurality of images based upon the relationship between the profile for each image and the values of the selection probability functions, and displays the selected images. Software executing on the computer receives an indication of at least one chosen image and adjusts the value of each of the selection probability functions based upon the profiles of the chosen images. The software selects and displays images, receives an indication of at least one chosen image, and adjusts the value of each of the selection probability functions iteratively until the search is terminated.

Preferably, each image profile comprises a plurality of rankings for a plurality of categories, and most preferably, the plurality of rankings comprise a plurality of characteristic functions, each of which represents a probability distribution function which describes the probability of an image being selected given user preferences within a category. Each of the plurality of characteristic functions may take the form of a Gaussian function, or a bell curve, although such is not strictly required.

Also preferably, each of the selection probability functions corresponds to one of the categories, and the initial values of the selection probability functions are set such that statistical weighting among the categories is even and no category is favored. The software executing on the computer preferably selects the images by randomly selecting values for each category, which value is in accordance with the selection probability function for that category, and selects images having characteristic functions corresponding to the randomly selected values for the categories. Preferably, each of the selection probability functions comprises a probability distribution function which describes the probability of a desired image being found, given the initial value of the selection probability function and the profiles of previously chosen images.

The invention and its particular features and advantages will become more apparent from the following detailed description considered with reference to the accompanying drawings.

DETAILED DESCRIPTION OF THE INVENTION

Figure 1:
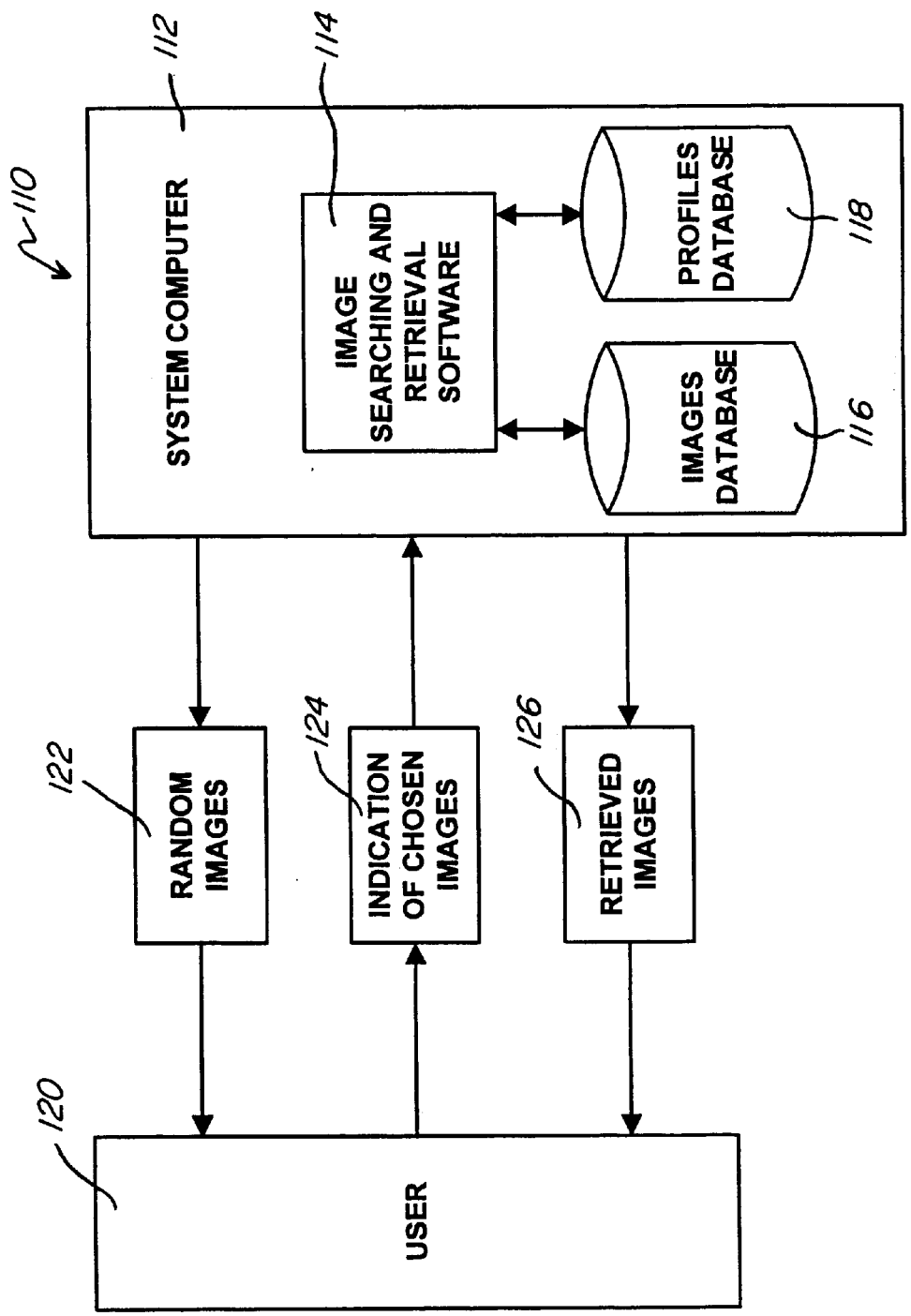
FIG. 1 is a block diagram of an image search and retrieval system in accordance with the present invention.

Referring first to FIG. 1, an image search and retrieval system 110 for searching for and retrieving a desired image from a collection of images in accordance with the present invention is shown in its simplest form. The system 110 includes a system computer 112 having image searching and retrieval software 114 executing thereon. System 110 also includes an images database 116 having an image collection stored thereon, and a profiles database 118 having stored thereon a profile for each of the images stored on image collection database 116.

System 110 allows a user 120 to search through large collections of graphical images visually by example, without the need to enter or use keywords or specific queries to locate the desired image. This is achieved using a stochastic process that iteratively selects images randomly from a collection and gathers user suggestions to skew these random selections towards the user's desires. Thus, image searching and retrieval software 114 selects and displays to user 120 a random selection of images 122. User 120 chooses one or more images from the random selection 122, and transmits an indication of chosen images 124 to system computer 112. Image searching and retrieval software 114 then skews search criteria towards the user's desires, as indicated by the images the user chose, retrieves images based upon this skewed search criteria, and displays the retrieved images 126 to user 120. If user 120 is satisfied with retrieved images 126, user 120 may end the process. If user 120 is not satisfied with retrieved images 126, user again chooses images, and image searching and retrieval software 114 again skews the search criteria based upon the users new choices and retrieves new images based upon the skewed criteria. This process continues iteratively until user 120 is satisfied with the retrieved images 126.

Figure 2:
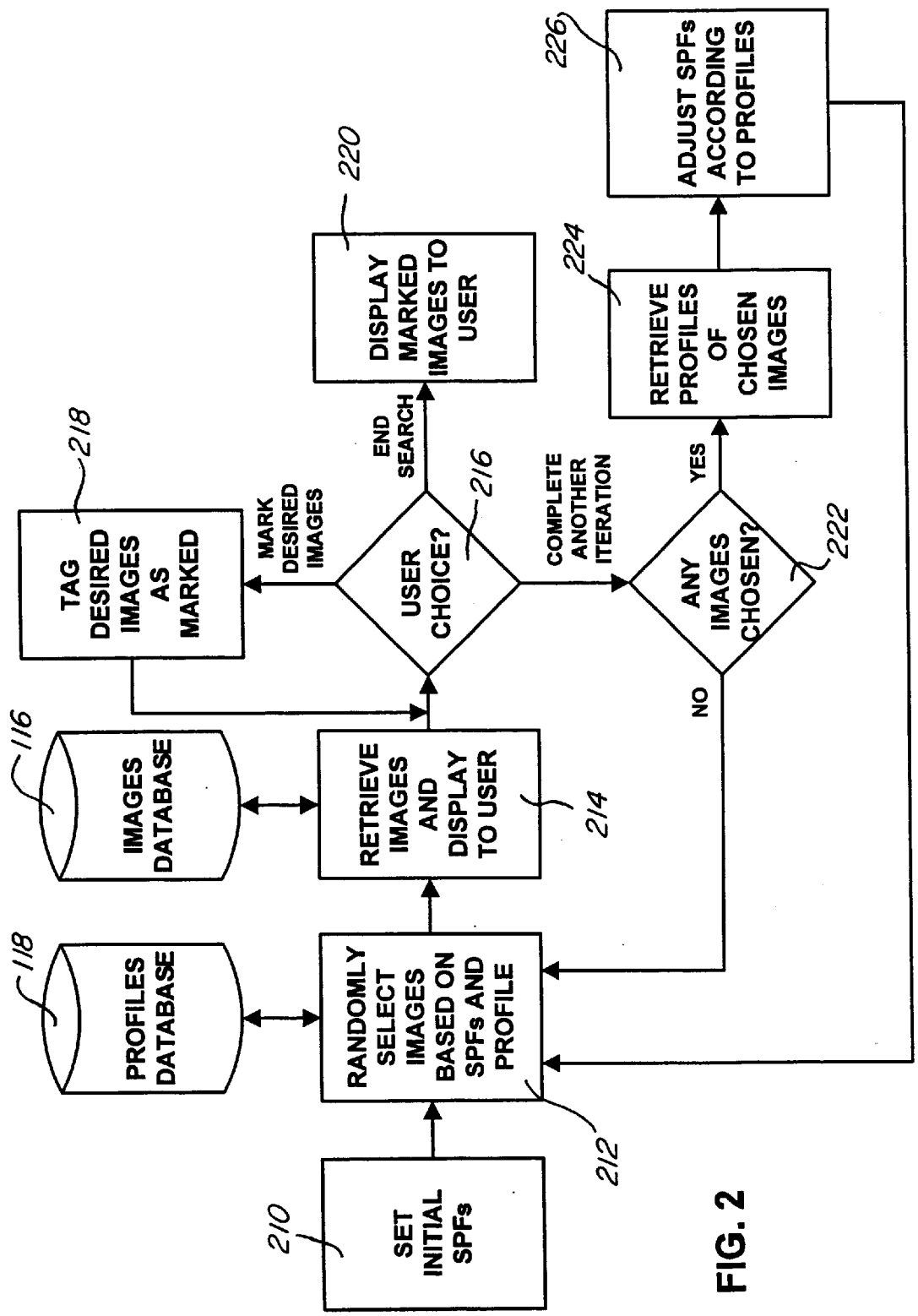
FIG. 2 is a block diagram illustrating in more detail the operation of the image search and retrieval system of FIG. 1.
Figure 3B:
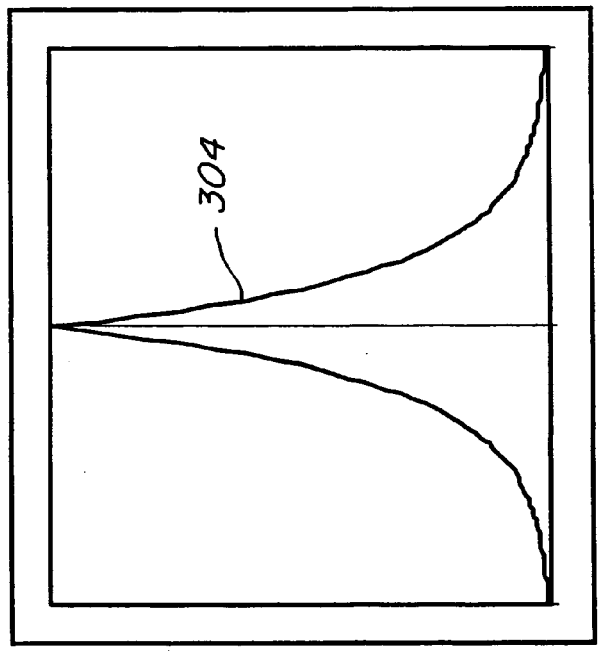
FIGS. 3A–3D are graphical representations of example characteristic functions which may be used in conjunction with the image search and retrieval system of FIG. 1.
Figure 3A:
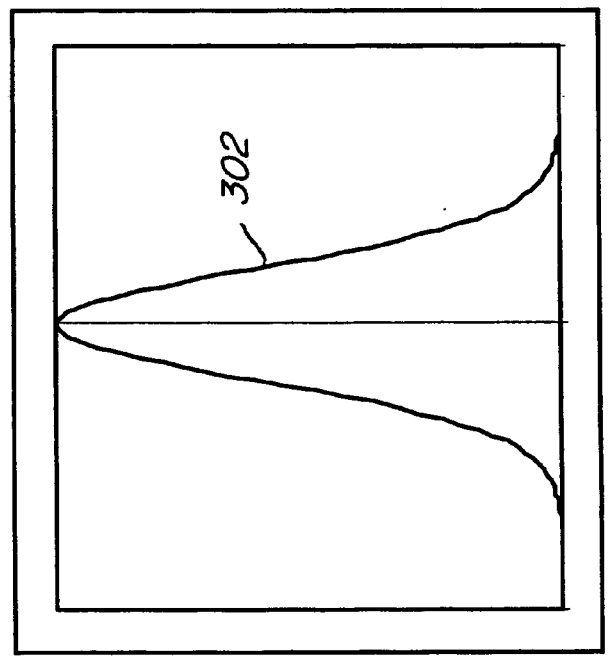
Figure 3D:
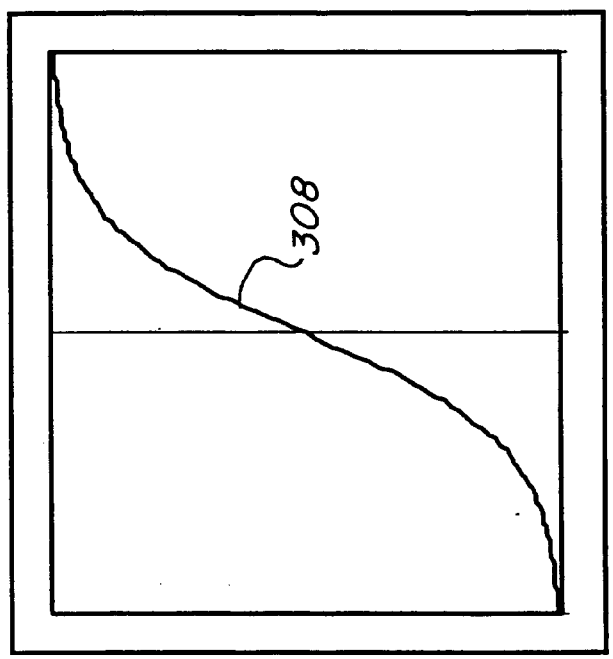
Figure 3C:
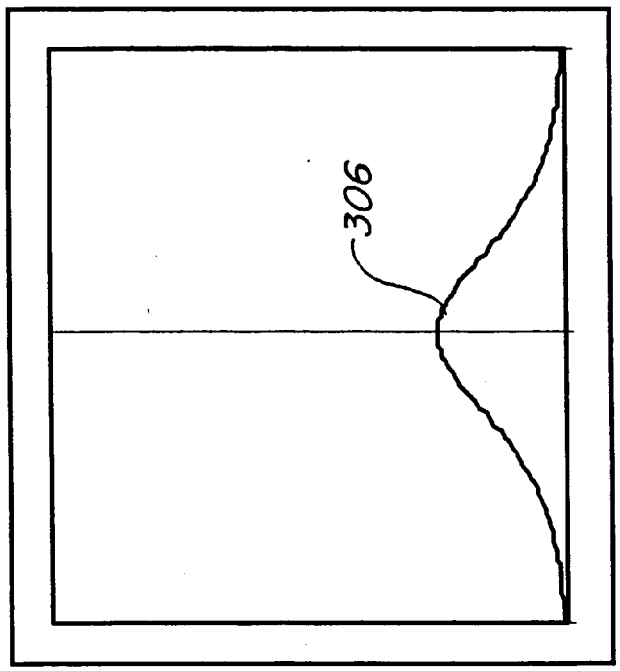

Referring now to FIG. 2, the image searching and retrieval process is shown in more detail. All of the graphical images stored on images database 116 are ranked on sliding scales by many categories that describe distinct elements of the images. Each category in the system of classification describes distinct elements or attributes of the graphical images. In other words, a category is an attribute class used to differentiate between images. For example, images can be ranked by brightness, amount of color, abstractness, number of people present, etc. Since many collections of graphical images already contain keywords for those images, the keywords can be analyzed to place images in categories. For example, examining keywords such as "contemporary", "Victorian", "civil war", "classical", and "ancient", and ranking those images containing these keywords respectively, could create the category of age. A rank or ranking is a metric or scale measure of the degree to which a graphical image fits in or can be described by a category. For example, an indication of where an image fits along a sliding scale in the age category.

Each image ranking in turn is used to describe a characteristic function for the image, which is a probability distribution function that describes the probability of the image being selected given various user preferences within the category. Many different characteristic functions can be used to describe the likelihood of a particular image being selected. FIGS. 3A–3D show several examples of distribution functions 302, 304, 306, 308 that may be applicable. The various category rankings and their characteristic functions make up a profile for each image. An image profile for each image stored on the images database 116 is stored on profiles database 118.

Referring again to FIG. 2, system 110, at 210, sets initial selection probability functions (SPFs) corresponding to each category so that the statistical weighting among the categories is even and no category is favored over others. An SPF is a probability distribution function that describes the likelihood of the desired image being found given an initial SPF and many characteristic functions representing the user's desires or suggestions, aggregated at each iteration for all categories. Preferably, an SPF is provided for each category—if there are ten categories for an image, that image will have ten SPFs. At 212, images are randomly selected from the image collection with the probability favoring selection of images with profiles (i.e., sets of characteristic functions) matching peak distributions of the SPFs. This random selection occurs by randomly retrieving profiles from the profiles database 118 based on the output of the SPFs. System 110, at 214, retrieves from images database 116, and displays to user 120 for viewing and selection, the random images 122 selected at 212.

As shown at 216, user 120 now has three courses of action: user 120 may select another iteration, possibly having chosen one or more images from the displayed images that contain desirable attributes; user 120 may choose to end the search at this point; or if a desired image is among the displayed images, user 120 may mark that image as a desired image. If user 120 chooses at 216 to mark an image as a desired image, system 110 tags the desired image as marked at 218, and presents user 120 with the choices described above at 216. If user 120 chooses to end the search, any desired images which have been marked by the user during the course of the search are now displayed, at 220, to the user 120. The user 120 has completed the search and may exit system 110 or begin another search.

Figure 4:
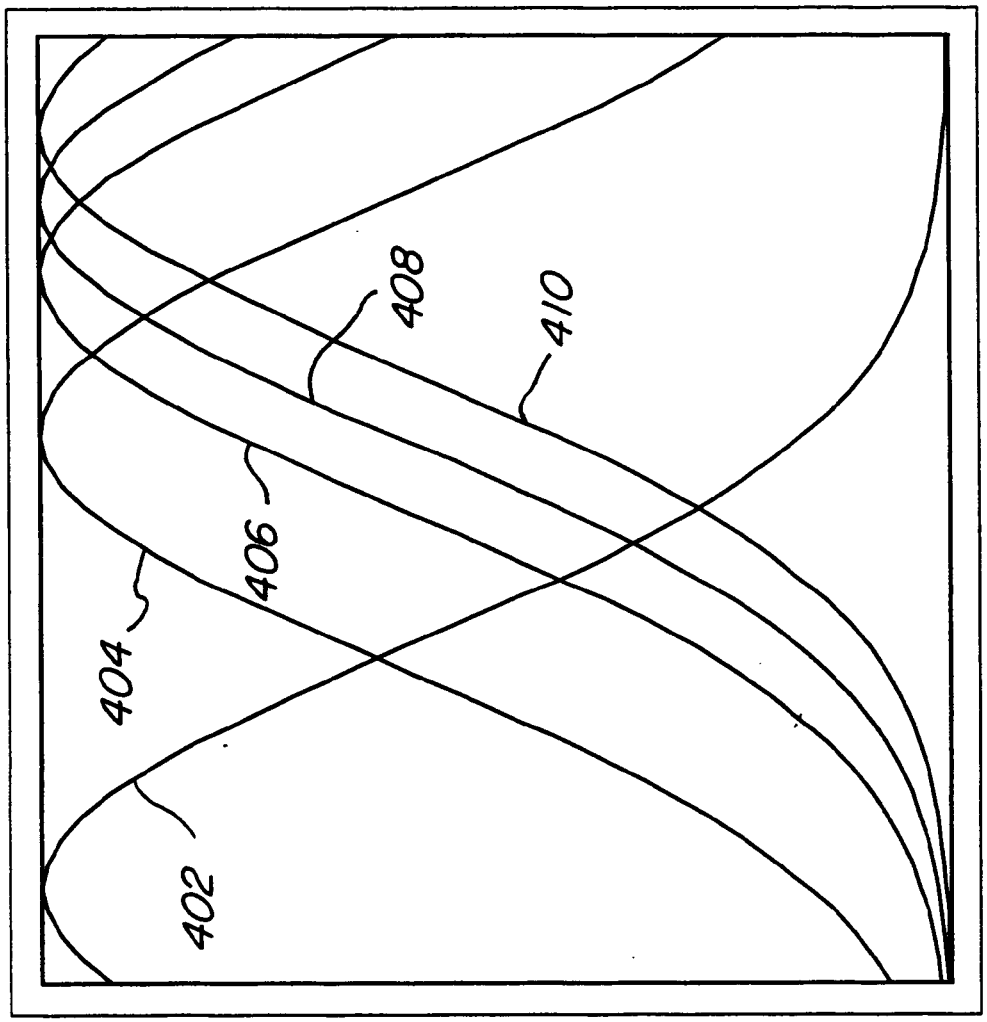
FIG. 4 is a graphical representation of the progression of a characteristic function over several iterations as a user chooses desired images during use of the image search and retrieval system of FIG. 1.
Figure 5:
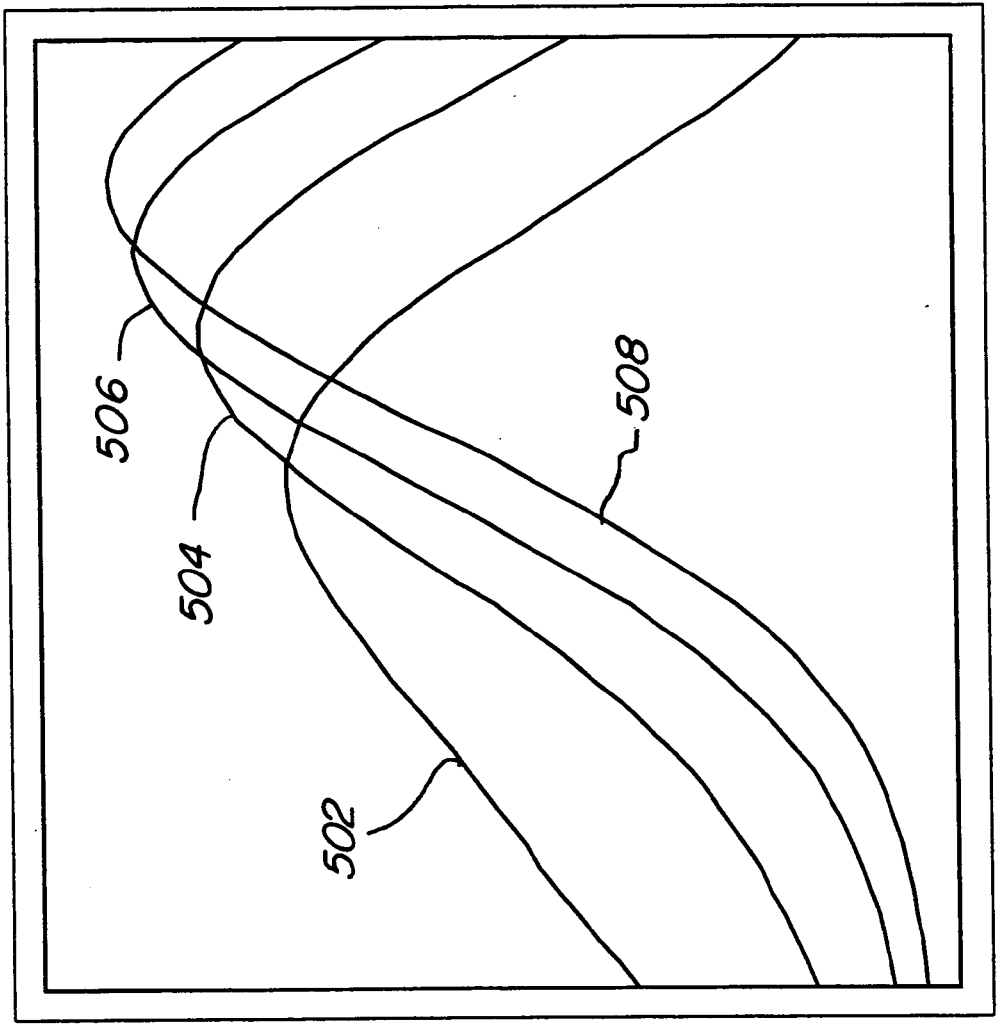
FIG. 5 is a graphical representation of the progression of a selection probability function over several iterations as a user chooses desired images during use of the image search and retrieval system of FIG. 1.

If user 120 chooses another iteration at 216, system 110 determines at 222 whether user 120 has chosen one or more images as containing desirable attributes. If such images have not been chosen, the SPFs are not altered, and system 110 again randomly selects images at 212 based upon the same SPFs. If user 120 has chosen one or more images as containing desirable attributes, the profile corresponding to each user chosen image is retrieved at 224 from profile database 118 and the characteristic functions from these profiles are examined and combined to adjust, at 226, the corresponding selection probability functions according to the strength of the rankings of the user chosen images. A higher percentage rank will be represented by a characteristic function skewed more towards this rank. The characteristic function will in turn skew the corresponding SPF, favoring the selection of images with similar profiles. As illustrated in FIGS. 4 and 5, as the user's desires and choices tend towards the right, as represented by the characteristic functions tending toward the right progressively from 402 to 410, the SPFs are skewed towards the right progressively from 502 to 508 to reflect these choices. As the probability densities skew right, rise and cluster near the peaks of the SPFs 502, 504, 506, 508, the probability of displaying a desired image rises as well. System 110 then begins another iteration by randomly selecting images from the image collection, at 212, with the probability favoring selection of images with profiles (i.e., sets of characteristic functions) matching peak distributions of the skewed SPFs.

Figure 6:
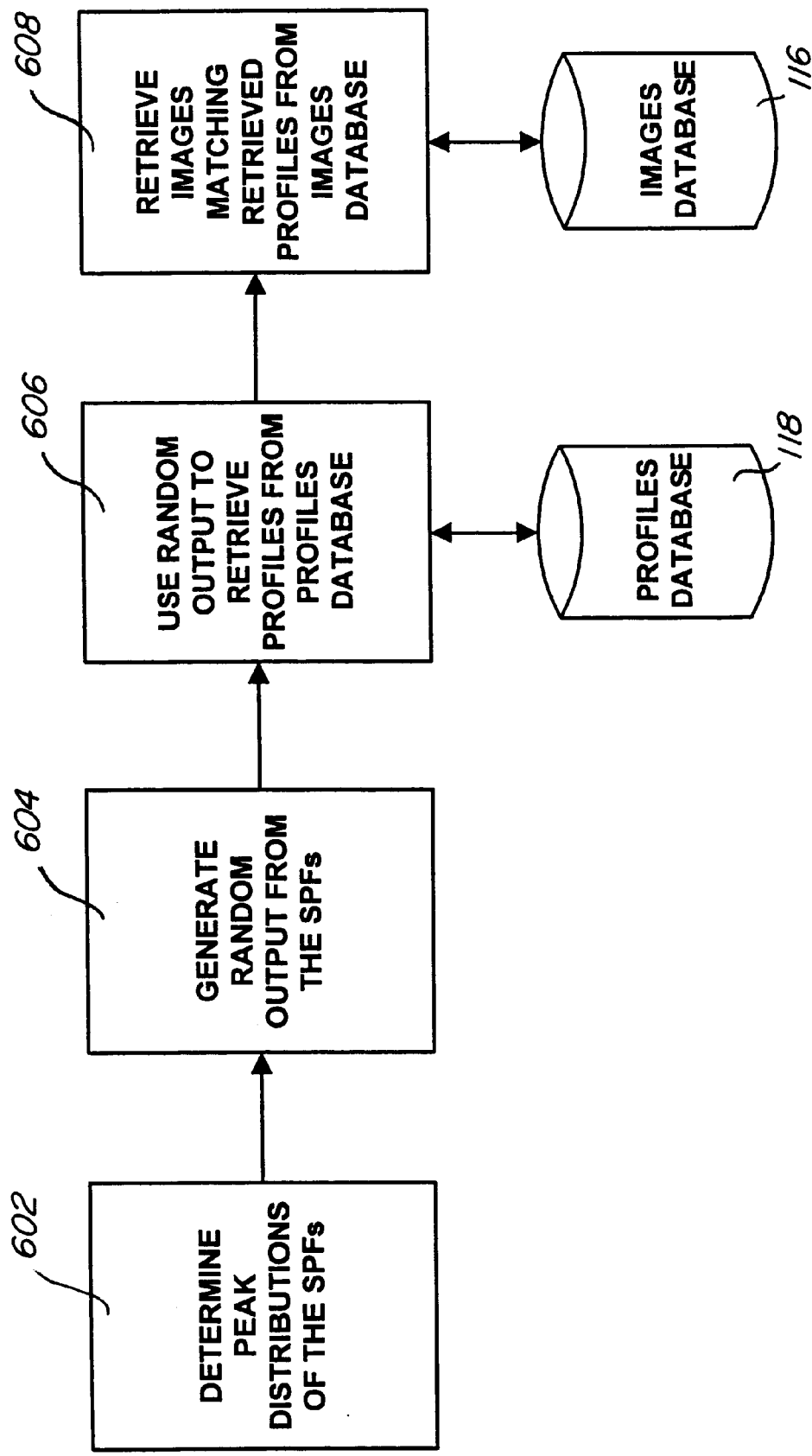
FIG. 6 is a block diagram illustrating selection of initial random images during operation of the image search and retrieval system of FIG. 1.

Referring now to FIG. 6, the image selection and retrieval process is shown in greater detail. At 602 system 110 determines peak distributions of the SPFs. If this is the first iteration, the SPFs are set so that the statistical weighting among the categories is even and no category is favored over others. If this is not the first iteration, the SPFs may be skewed so that one or more categories is favored. System 110, at 604 generates random output which is in accordance with the SPFs, that is, the random output for each category may vary with each iteration or with each search, but will fall within the probability function defined by the SPF for that category. In this way, different outputs may be generated, and thus different images may be retrieved and displayed, in successive iterations even if the user does not choose one or more images to skew the SPFs. At 606, system 110 uses the random output generated at 604 to retrieve image profiles from profiles database 118. Each of the image profiles contains an indication of a matching image which is stored on images database 116, which indication is used by system 110, at 608, to retrieve from images database 116 images matching the retrieved profiles.

Figure 7:
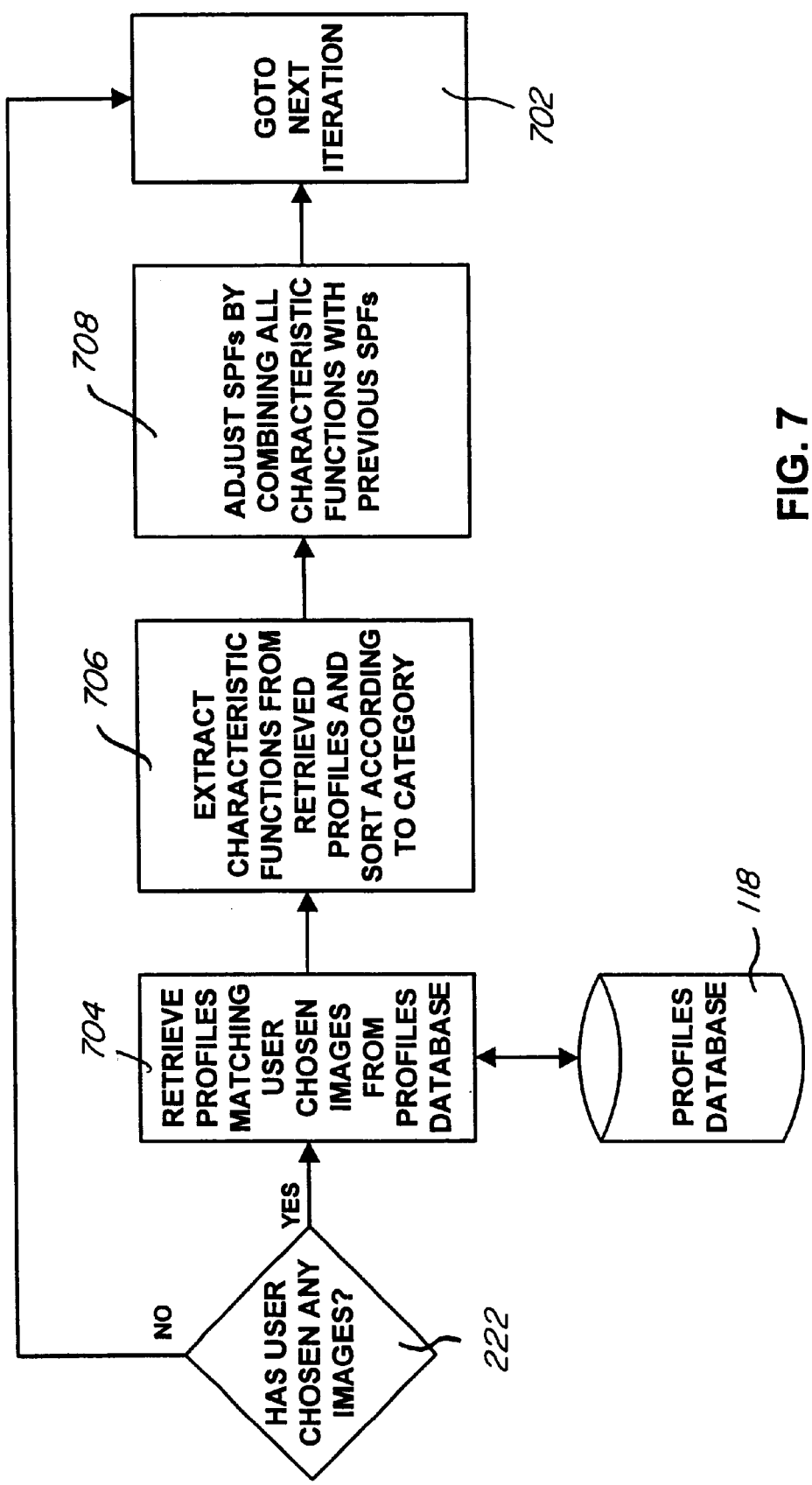
FIG. 7 is a block diagram illustrating the adjusting of selection probability functions during operation of the image search and retrieval system of FIG. 1.

Referring now to FIG. 7, the operation of system 110 when a user has elected to complete another iteration at 216 (FIG. 2) is shown in greater detail. As discussed above, system 110 determines at 222 whether user 120 has chosen one or more images as containing desirable attributes. If such images have not been chosen, the SPFs are not altered, and system begins another iteration at 702, again randomly selecting images based upon the same SPFs. If user 120 has chosen one or more images as containing desirable attributes, the profile corresponding to each user chosen image is retrieved at 704 from profile database 118. At 706, the characteristic functions are extracted from the retrieved profiles and are sorted according to category. The SPFs are adjusted at 708 by combining the characteristic functions of all profiles for each category with the previous SPF for each corresponding category. The SPFs are thus skewed according to the strength of the rankings of the user chosen images. System 110 then begins another iteration at 702 by randomly selecting images from the image collection with the probability favoring selection of images with profiles (i.e., sets of characteristic functions) matching peak distributions of the skewed SPFs.

Thus, in operation, system 110 first displays a random sample of images from the collection. The user chooses one or more images from this sample that contain desirable attributes. The profiles of the selected images are used to weight or skew the next random sample of images displayed towards the desired attributes. This new sample of images will be statistically more heavily weighted toward the profiles of the images that were selected from the previous sample. The user again chooses one or more images from the new sample that contain desirable attributes and the process repeats. The process ends when the user finds the image or images he or she desires from a sample. The number of these "repeats" or iterations should not typically exceed 30 depending upon the size of the collection and the number of images displayed to the user with each iteration. The actual number of images to be viewed at one time will not affect the functionality of the system other than to increase the required number of iterations as the number of images viewed decreases. The number of images to be viewed at a time may vary from iteration to iteration. It has been found that providing the user with 20 images at each iteration provides desirable results.

Moreover, several variations of the above-described process are possible. In addition to more heavily weighting high ranked categories in the profiles of selected images, it is possible to make the method more aggressive by negatively weighting low ranked categories in these profiles as well. Also, instead of displaying a random sample in the first iteration, user preferences can be used to narrow the initial sample displayed. This method can also be used in combination with standard keyword search systems to narrow the initial selection. For example, if the user wants images of dogs but cannot further refine the keyword query, this method can be used to avoid forcing the user to browse through every image in the collection that contains a dog. By combining the systems, the initial random sample will be from the pool of dog images only.

The number of categories may be fixed and be constant for all images in the image collection and all image profiles may contain the same number of rankings and characteristic functions. This is not necessary for the proper functioning of the system but is preferable for convenience. The characteristic functions may preferably be based on a bell curve or Gaussian function where the ranking is the mean of the function and the standard deviation is fixed. The probability distribution of the initial random sample of images given by the initial SPF may be a Gaussian function or bell curve, but such is not required. In general, the initial SPF distribution should favor images that the user is most likely to desire. Moreover, there may be one SPF that is an aggregate of all categories or there may be many SPFs, one for each category. The categories themselves may be rankings along a continuum rather than rankings measuring amount. For example, images may be ranked on a color scale from red to blue where 10 indicates red and 5 indicates green and 0 indicates blue.

Figure 8:
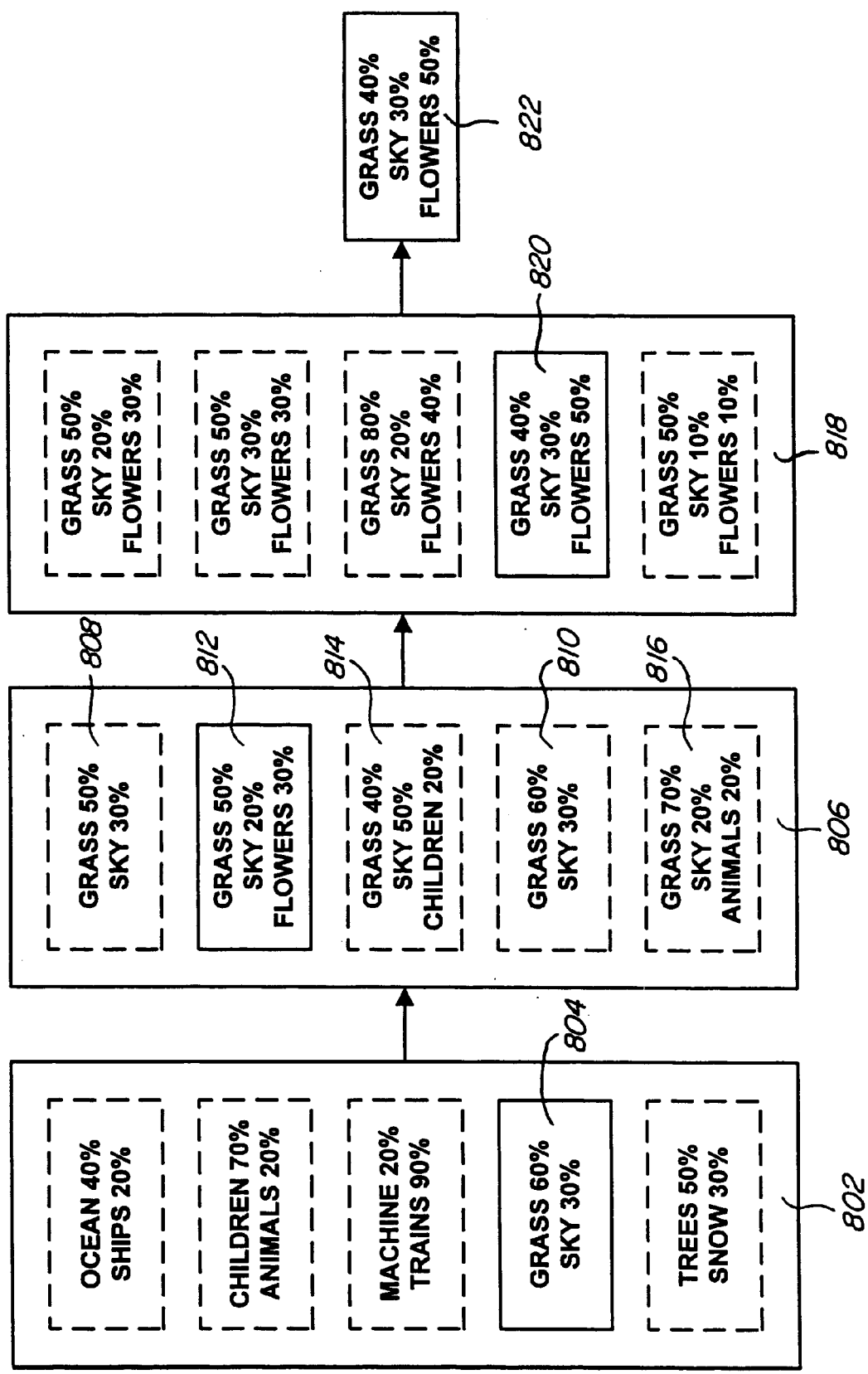
FIG. 8 is a block diagram illustrating a simplified example of operation of the image search and retrieval system of FIG. 1.

Referring now to FIG. 8, in which a simplified example of an image search using system 110 is shown. In this example, user 120 has a general mental impression that an image showing a meadow is desired. System 110 retrieves and displays to user 120 a set of random images at 802. At this stage, all SPFs are weighted equally, and the displayed images relate to a broad range of topics. Image 804 relates to a meadow, and is weighted in the grass and sky categories to so reflect. The other images relate to various other topics. As user 120 desires an image relating to a meadow, user 120 chooses image 804 (indicated by solid lines) and does not choose the other images at this stage (indicated by dashed lines).

System 110 retrieves the profile associated with image 804, adjusts the SPFs according to the profile, and retrieves images according to the adjusted SPFs at 806. The retrieved images have attributes which correspond to the weighted SPFs, in this example, SPFs weighted more heavily in the grass and sky categories. Thus, images 808, 810 relate to meadows, and have profiles weighted accordingly in the grass and sky categories. Image 812 relates to a meadow with flowers. Thus the profile for image 812 is weighted in the flowers category in addition to the grass and sky categories. Similarly, image 814 relates to a meadow with children playing therein and image 816 relates to a meadow with animals therein, and each is weighted accordingly.

User 120 now decides that a meadow with flowers therein is desirable and chooses image 812 (indicated by solid lines) and does not choose the other images at this stage (indicated by dashed lines). System 110 retrieves the profile associated with image 812, adjusts the SPFs according to the profile, and retrieves images according to the adjusted SPFs at 818. The retrieved images have attributes which correspond to the weighted SPFs, in this example, SPFs weighted more heavily in the grass, sky and flowers categories. Thus, all of the retrieved images relate to meadows with flowers, and have profiles weighted accordingly in the grass, sky and flowers categories. Image 820 is particularly appealing to user 120 and thus user 120 chooses image 820 (indicated by solid lines) and does not choose the other images at this stage (indicated by dashed lines). If user 120 is now satisfied, user 120 may terminate the search, and system 110 displays image 820 at 822.

Figure 9:
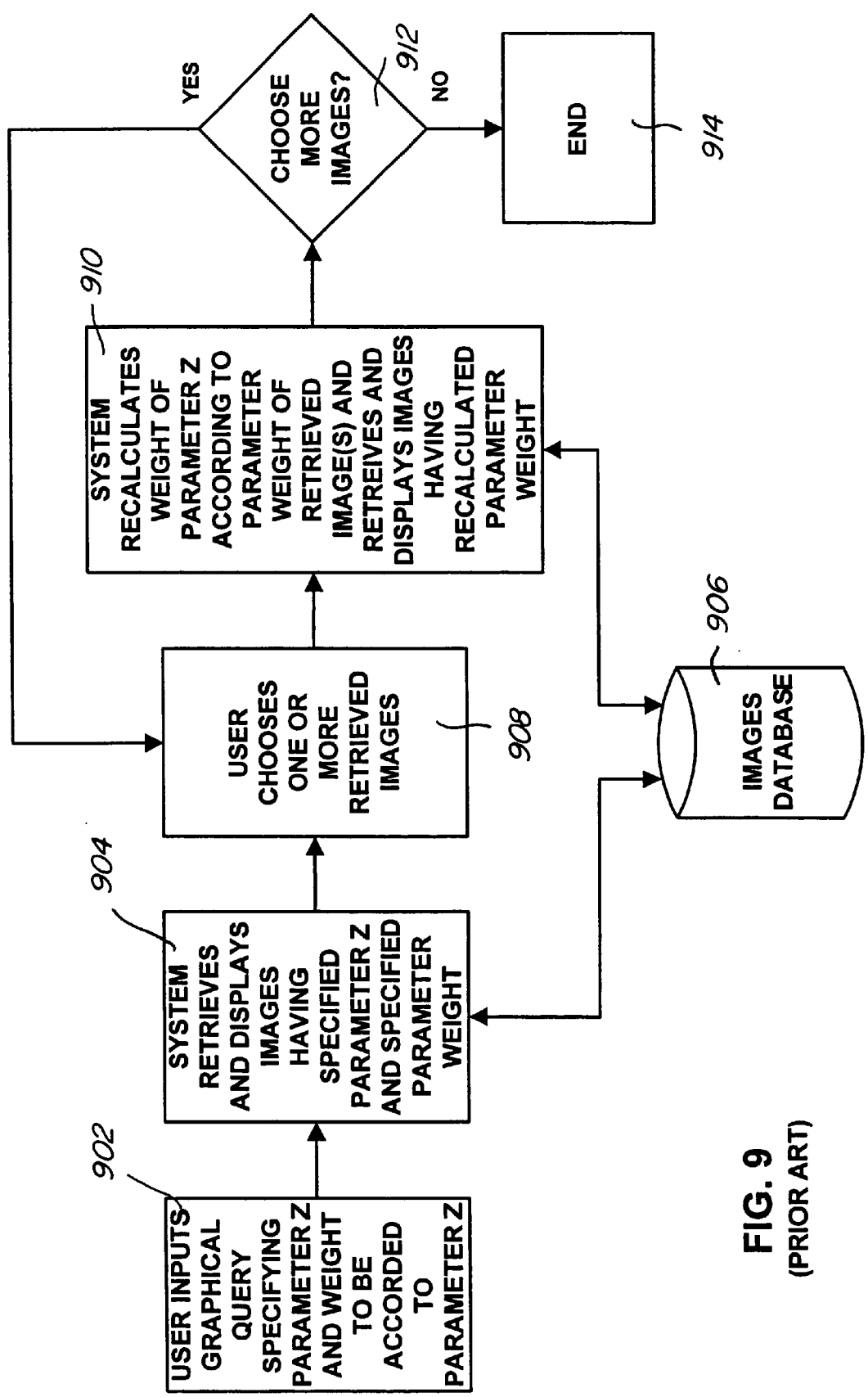
FIG. 9 is a block diagram illustrating the general operation of a prior art image search and retrieval system.
Figure 10:
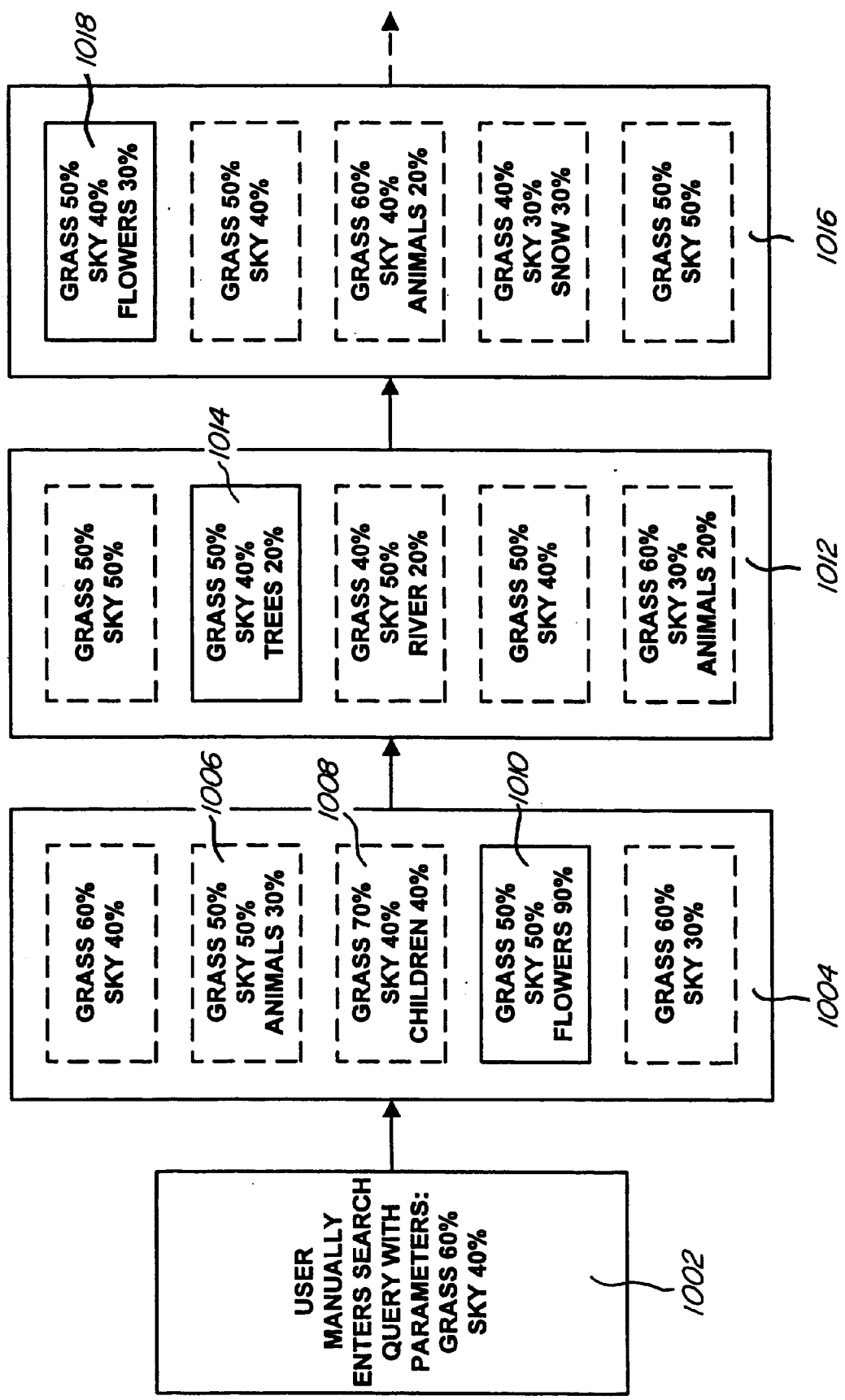
FIG. 10 is a block diagram illustrating a simplified example of operation of the prior art image search and retrieval system of FIG. 9.

Referring now to FIGS. 9 and 10, which illustrate the operation of the system disclosed in U.S. Pat. No. 5,802,361 ("the '361 patent"). As discussed above, a user of this system must use an interface to graphically construct a search inquiry with icons representing image attributes corresponding to image data reflective of the images stored on the system. Suppose, as in the above example, the user has a general mental impression that an image showing a meadow is desired. The user, at 1002 manually enters a search query reflecting this desire. For example, the user may enter that grass is desired and should be weighted at 60% and sky is desired and should be weighted at 40%. It should be noted that such manual entry of a search query is itself undesirable. Such a system does nothing to help the situation where a user is having trouble visualizing precisely what is desired for an image. If the user cannot visualize the image, the user will not be able to enter a graphical inquiry. Moreover, framing a graphical inquiry, even if the user can visualize what is desired may be difficult.

Once the graphical search inquiry is entered, the system examines the parameters associated with the images stored on the system and retrieves images at 1004 with parameters which come as close as possible to the weights of the specified parameters. For example, as the user entered 60% grass and 40% sky, the returned images will all have weights close to 60% grass and 40% sky. The images may or may not also have additional elements, such as animals 1006, children 1008 or flowers 1010. The user now decides that a meadow with flowers therein is desirable and chooses image 1010 (indicated by solid lines) and does not choose the other images at this stage (indicated by dashed lines). The system examines the parameters associated with image 1010, and adjusts the search parameters accordingly. For example, the grass parameter is now weighted at 50% and the sky parameter is now weighted at 50%. However, as the user only specified the grass and sky parameters in the search inquiry, all other image elements are disregarded. Thus, the flower parameter does not become part of the search process.

The system again examines the parameters associated with the images stored on the system and retrieves images at 1012 with parameters which come as close as possible to the weights of the weighted parameters from the last step (i.e., 50% grass and 50% sky). Note that the system at 1012 may not retrieve any images showing a meadow with flowers despite the fact that the image chosen by the user in the previous iteration was weighted 90% in the flowers parameter. This is true because, since the flower parameter was not specified in the initial search inquiry, it does not become part of the search.

As there are no images of meadows with flowers from which to choose, the user now chooses image 1014 (indicated by solid lines) showing a meadow with trees and does not choose the other images at this stage (indicated by dashed lines). The system examines the parameters associated with image 1014, and adjusts the search parameters accordingly. For example, the grass parameter is still weighted at 50% and the sky parameter is now weighted at 40%. The system again examines the parameters associated with the images stored on the system and retrieves images at 1016 with parameters which come as close as possible to the weights of the weighted parameters from the last step (i.e., 50% grass and 40% sky). Note that the system may again retrieve an image 1018 showing a meadow with flowers. However, such an event is completely based upon the luck of the user, as the image has been retrieved solely based on the weights of its grass and sky parameters, regardless of whether or not flowers are present.

The user chooses image 1018 (indicated by solid lines) showing a meadow with flowers and does not choose the other images at this stage (indicated by dashed lines), and the process iteratively repeats until the user finds the desired image or until the user becomes frustrated and ends the search. It may take numerous iterations before the system retrieves even a single additional image of a meadow with flowers, and many more iterations before the user is presented (even individually) with each of the five images of meadows with flowers which were returned by system 110 at 818 (FIG. 8) after only three iterations when the present invention is used. Using the system disclosed in the '361 patent, the user must disadvantageously have either known from the beginning of the search that flowers were a desired parameter when framing the initial search inquiry, or must end the current search and begin a new search specifying that flowers are a desired parameter.

The present invention, therefore, provides a significant advancement over the prior art by providing an image search system for searching for and retrieving a desired image from a collection of images which is efficient and allows users to quickly find desired images, which is accurate in returning images likely to be desirable to the user, which does not require the user to verbalize desirable image attributes, which does not require the user to preconceive a mental image of what is desired before the search, which does not require the user to enter a search query, and which is adaptable in that the system readily and automatically adjusts search criteria during the search to reflect a user's desires.

Although the invention has been described with reference to a particular arrangement of parts, features and the like, these are not intended to exhaust all possible arrangements or features, and indeed many other modifications and variations will be ascertainable to those of skill in the art.

What is claimed is:

1. An image search system comprising:
    a computer;
    a plurality of images accessible by said computer, each of the plurality of images having associated therewith an image profile accessible by said computer, the image profile comprising information about the subject matter of the associated image;
    a plurality of selection probability functions, said plurality of selection probability functions being set to initial values;
    software executing on said computer for iteratively selecting and displaying a plurality of images, the plurality of images being selected based upon the relationship between the profile for each image and the values of the selection probability functions; and
    software executing on said computer being responsive to a selection of one or more chosen images and iteratively adjusting the value of one or more of the selection probability functions based upon the profiles of the chosen images, wherein said software selects and displays, receives an indication of at least one chosen image, and adjusts the value of each of the selection probability functions iteratively until the search is terminated.

2. The image search system of claim 1 wherein each image profile comprises a plurality of categories, with a ranking of the image for one or more of said plurality of categories.

3. The image search system of claim 2 wherein each ranking comprises a characteristic function.

4. The image search system of claim 3 wherein said characteristic function comprises a probability distribution function which describes the probability of an image being selected given user preferences within a category.

5. The image search system of claim 4 wherein said characteristic function comprises a Gaussian function.

6. The image search system of claim 4 wherein said characteristic function comprises a bell curve.

7. The image search system of claim 2 wherein each of said selection probability functions corresponds to one of the categories.

8. The image search system of claim 7 wherein the initial values of said plurality of selection probability functions are set such that statistical weighting among the categories is even and no category is favored.

9. The image search system of claim 7 wherein said software executing on said computer for selecting and displaying a plurality of images randomly selects values for each category, which value is in accordance with the selection probability function for that category, and selects images having characteristic functions corresponding to the randomly selected values for the categories.

10. The image search system of claim 1 wherein each of the selection probability functions comprises a probability distribution function which describes the probability of a desired image being found given the initial value of the selection probability function and the profiles of previously chosen images.

11. An image search system comprising:
a computer;
a plurality of images accessible by said computer, each of the plurality of images having associated therewith a plurality of characteristic functions for a plurality of categories accessible by said computer, at least one of the plurality of categories relating to the subject matter of the associated image;
a plurality of selection probability functions, each of said selection probability functions corresponding to one of the categories, said plurality of selection probability functions being set to initial values;
software executing on said computer for selecting and displaying a plurality of images, the plurality of images being selected based upon the relationship between the characteristic functions for each image and the values of the selection probability functions;
software executing on said computer for receiving an indication of at least one chosen image and for adjusting the value of each of the selection probability functions based upon the characteristic functions of the chosen images; and
wherein said software selects and displays, receives an indication of at least one chosen image, and adjusts the value of each of the selection probability functions iteratively until the search is terminated.

12. The image search system of claim 11 wherein each of the plurality of characteristic functions comprises a probability distribution function which describes the probability of an image being selected given user preferences within a category.

13. The image search system of claim 12 wherein one or more of the plurality of characteristic functions comprises a Gaussian function.

14. The image search system of claim 12 wherein one or more of the plurality of characteristic functions comprises a bell curve.

15. The image search system of claim 11 wherein each of the selection probability functions comprises a probability distribution function which describes the probability of a desired image being found given the initial value of the selection probability function and the characteristic functions of previously chosen images.

16. The image search system of claim 11 wherein the initial values of said plurality of selection probability functions are set such that statistical weighting among the categories is even and no category is favored.

17. The image search system of claim 11 wherein said software executing on said computer for selecting and displaying a plurality of images randomly selects values for each category, which value is in accordance with the selection probability function for that category, and selects images having characteristic functions corresponding to the randomly selected values for the categories.

18. An image search system comprising:
a computer;
a database accessible by said computer;
a plurality of images stored on said database, each of the plurality of images having associated therewith information about the subject matter of the associated image; and
software executing on said computer for iteratively selecting images randomly from said plurality of images by using a stochastic process which takes into account the subject matter of the associated images, for gathering user suggestions, and for skewing the random selection toward the user suggestions.

19. The image search system of claim 18 wherein said software iteratively selects images randomly from said plurality of images by using a stochastic process based upon at least one probability distribution function.

20. A method for searching and retrieving a desired image comprising the steps of:
providing a computer;
providing a plurality of images accessible by the computer, each of the plurality of images having associated therewith an image profile accessible by the computer, the image profile comprising information about the subject matter of the associated image;
providing a plurality of selection probability functions;
setting the plurality of selection probability functions to initial values;
selecting a plurality of images based upon the relationship between the profile for each image and the values of the selection probability functions;
displaying the selected images;
receiving an indication of at least one chosen image;
adjusting the value of each of the selection probability functions based upon the profiles of the chosen images; and
repeating said selecting step, said displaying step, said receiving step and said adjusting step until the search is terminated.

21. The method of claim 20 wherein each image profile comprises a plurality of rankings for a plurality of categories.

22. The method of claim 21 wherein the plurality of rankings comprise a plurality of characteristic functions.

23. The method of claim 22 wherein each of the plurality of characteristic functions comprises a probability distribution function which describes the probability of an image being selected given user preferences within a category.

24. The method of claim 23 wherein one or more of the plurality of characteristic functions comprises a Gaussian function.

25. The method of claim 23 wherein one or more of the plurality of characteristic functions comprises a bell curve.

26. The method of claim 21 wherein each of said selection probability functions corresponds to one of the categories.

27. The method of claim 26 wherein said setting the plurality of selection probability functions to initial values step comprises the step of setting the initial values of the plurality of selection probability functions such that statistical weighting among the categories is even and no category is favored.

28. The method of claim 26 wherein said step of selecting a plurality of images comprises randomly selecting values for each category, which value is in accordance with the selection probability function for that category, and selecting images having characteristic functions corresponding to the randomly selected values for the categories.

29. The method of claim 20 wherein each of the selection probability functions comprises a probability distribution function which describes the probability of a desired image being found given the initial value of the selection probability function and the profiles of previously chosen images.

30. A method for searching and retrieving a desired image comprising the steps of:

providing a computer;

providing a plurality of images accessible by the computer, each of the plurality of images having associated therewith a plurality of characteristic functions for a plurality of categories accessible by the computer, at least one of the plurality of categories relating to the subject matter of the associated image;

providing a plurality of selection probability functions, each of the selection probability functions corresponding to one of the categories;

setting the plurality of selection probability functions to initial values;

selecting a plurality of images based upon the relationship between the characteristic functions for each image and the values of the selection probability functions;

displaying the selected images;

receiving an indication of at least one chosen image;

adjusting the value of each of the selection probability functions based upon the characteristic functions of the chosen images; and repeating said selecting step, said displaying step, said receiving step and said adjusting step until the search is terminated.

31. The method of claim 30 wherein each of the plurality of characteristic functions comprises a probability distribution function which describes the probability of an image being selected given user preferences within a category.

32. The method of claim 31 wherein one or more of the plurality of characteristic functions comprises a Gaussian function.

33. The method of claim 31 wherein one or more of the plurality of characteristic functions comprises a bell curve.

34. The method of claim 30 wherein each of the selection probability functions comprises a probability distribution function which describes the probability of a desired image being found given the initial value of the selection probability function and the characteristic functions of previously chosen images.

35. The image search system of claim 30 wherein said setting the plurality of selection probability functions to initial values step comprises the step of setting the initial values of the plurality of selection probability functions such that statistical weighting among the categories is even and no category is favored.

36. The method of claim 30 wherein said selecting a plurality of images step comprises the step of randomly selecting values for each category, which value is in accordance with the selection probability function for that category, and selecting images having characteristic functions corresponding to the randomly selected values for the categories.

37. A method for searching and retrieving a desired image comprising the steps of:

providing a computer;

providing a database accessible by the computer;

storing a plurality of images on the database, each of the plurality of images having associated therewith information about the subject matter of the associated image;

selecting images randomly from the plurality of images by using a stochastic process which takes into account the subject matter of the associated images;

gathering user suggestions;

skewing the random selection toward the user suggestions; and iteratively repeating said selecting step, said gathering step and said skewing step until the search is terminated.

38. The method of claim 37 wherein said selecting step comprises the step of selecting images randomly from the plurality of images by using a stochastic process based upon at least one probability distribution function.

39. An image search system comprising:

a computer;

a plurality of images accessible by said computer, each of the plurality of images having associated therewith an image profile accessible by said computer;

a plurality of selection probability functions, said plurality of selection probability functions being set to initial values, wherein each of said selection probability functions is a statistical function;

software executing on said computer for iteratively selecting and displaying a plurality of images, the plurality of images being selected based upon the relationship between the profile for each image and the values of the selection probability functions; and software executing on said computer being responsive to a selection of one or more chosen images and iteratively adjusting the value of one or more of the selection probability functions based upon the profiles of the chosen images, wherein said software selects and displays, receives an indication of at least one chosen image, and adjusts the value of each of the selection probability functions iteratively until the search is terminated.

40. The image search system of claim 39 wherein each image profile comprises a plurality of categories, with a ranking of the image for one or more of said plurality of categories.

41. The image search system of claim 40 wherein each ranking comprises a characteristic function.

42. The image search system of claim 41 wherein said characteristic function comprises a probability distribution function which describes the probability of an image being selected given user preferences within a category.

43. The image search system of claim 42 wherein said characteristic function comprises a Gaussian function.

44. The image search system of claim 42 wherein said characteristic function comprises a bell curve.

45. The image search system of claim 40 wherein each of said selection probability functions corresponds to one of the categories.

46. The image search system of claim 45 wherein the initial values of said plurality of selection probability functions are set such that statistical weighting among the categories is even and no category is favored.

47. The image search system of claim 45 wherein said software executing on said computer for selecting and displaying a plurality of images randomly selects values for each category, which value is in accordance with the selection probability function for that category, and selects images having characteristic functions corresponding to the randomly selected values for the categories.

48. The image search system of claim 39 wherein each of the selection probability functions comprises a probability distribution function which describes the probability of a desired image being found given the initial value of the selection probability function and the profiles of previously chosen images.

* * * * *